United States Patent
Lin et al.

(10) Patent No.: US 6,809,057 B2
(45) Date of Patent: Oct. 26, 2004

(54) CHROMIUM COMPOUNDS AND OLEFIN POLYMERIZATION PROCESSES UTILIZING THEM

(75) Inventors: Zerong Lin, Kingwood, TX (US); Robert T. Li, Houston, TX (US); Anthony N. Speca, Kingwood, TX (US); Stanley J. Katzen, Baton Rouge, LA (US); David H. McConville, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/364,489

(22) Filed: Feb. 10, 2003

(65) Prior Publication Data

US 2004/0157729 A1 Aug. 12, 2004

(51) Int. Cl.$^7$ .................................................. C08F 4/69
(52) U.S. Cl. ........................ 502/152; 502/103; 502/154; 526/124.2; 526/160; 526/169
(58) Field of Search ................................ 502/154, 103, 502/152; 526/124.2, 160, 169

(56) References Cited

U.S. PATENT DOCUMENTS

| | | | |
|---|---|---|---|
| 3,694,422 A | 9/1972 | Long | 260/93.7 |
| 3,875,132 A | 4/1975 | Kruse | 260/93.7 |
| 4,001,195 A | 1/1977 | Wyatt | 526/348 |
| 4,376,722 A | 3/1983 | Chester et al. | 252/430 |
| 4,446,423 A | 5/1984 | Hakhverdian | 324/60 C |
| 4,668,808 A | 5/1987 | Smith | 556/12 |
| 4,810,734 A | 3/1989 | Kawasumi et al. | 523/216 |
| 4,889,885 A | 12/1989 | Usuki et al. | 524/445 |
| 5,344,900 A | 9/1994 | Maezawa et al. | 526/160 |
| 5,491,272 A | 2/1996 | Tanaka et al. | 585/520 |
| 5,639,900 A | 6/1997 | Bell et al. | 556/57 |
| 5,665,183 A | 9/1997 | Kresge et al. | 152/204 |
| 5,684,100 A | 11/1997 | Carney et al. | 526/160 |
| 5,693,728 A | 12/1997 | Okamoto et al. | 526/115 |
| 5,747,560 A | 5/1998 | Christiani et al. | 523/209 |
| 5,807,629 A | 9/1998 | Elspass et al. | 428/323 |
| 5,936,023 A | 8/1999 | Kato et al. | 524/445 |
| 6,117,932 A | 9/2000 | Hasegawa et al. | 524/445 |
| 6,121,361 A | 9/2000 | Usuki et al. | 524/445 |
| 6,133,495 A | 10/2000 | Urata et al. | 585/513 |
| 6,242,543 B1 | 6/2001 | Follestad et al. | 526/118 |
| 6,465,585 B2 * | 10/2002 | Luo | |
| 6,646,069 B2 | 11/2003 | Monoi et al. | 526/105 |

OTHER PUBLICATIONS

"Surface Organometallic Investigation of the Mechanism of Ethylene Polymerization by Silica–Supported Cr Catalysts", Susannah L. Scott and Jamila Amor Nait Ajjou, Chemical Engineering Science 56 (2001) 4155–4168.

"Ethylene Polymerization Catalysts from Supported Organotransition Metal Complexes, II. Chromium Alkyls", P. D. Smith and M. P. McDaniel, Journal of Polymer Science: Part A: Polymer Chemistry, vol. 28, 3587–3601 (1990).

Ikeda, H. et al., "Ethylene Polymerizations with Alkyl–, Disilylamino–and Cyclopentadienylchromium/MMAO Initiators," *Macromol. Chem. Phys.* vol. 202, pp. 1806–1811 (2002).

* cited by examiner

*Primary Examiner*—Caixia Lu
(74) *Attorney, Agent, or Firm*—Paige Schmidt; Catherine L. Bell

(57) ABSTRACT

An olefin polymerization catalyst system, comprising a catalyst represented by the general formula $CrR_4$, wherein each R is independently a hydrocarbyl or substituted hydrocarbyl, with the proviso that R may not be a cyclopentadienyl group, an activator represented by the general formula, $MQ_2$, where M is a Group II metal, where each Q is independently an alkyl, or substituted alkyl; and a support. The support may be organic or inorganic. Ethylene and one or more olefins may be polymerized by the catalyst system.

20 Claims, No Drawings

CHROMIUM COMPOUNDS AND OLEFIN POLYMERIZATION PROCESSES UTILIZING THEM

FIELD

Embodiments of our invention relate to organo-chromium compounds and generally to tetra-hydrocarbyl chromium compounds and to their use for the polymerization of olefins.

BACKGROUND

Chromium catalyst systems are known. In the past these systems have included chromium oxides and silyl chromate catalysts. These catalysts however, suffer from relatively sparse or low activity, as measured by the amount of polymer produced per weight unit of catalyst. Further, these previous catalyst systems suffer from a lengthy induction period.

A chromium catalyst system that simultaneously has high activity and reduced induction time would be commercially advantageous.

In Chemical Engineering Science 56 (2001) 4155–4168, the authors suggest alkyl chromium active centers bound to silica by two Si—O—Cr linkages, which are said to coordinate ethylene. Insertion of the coordinated olefin into one of two growing alkyl chains is said to occur, provided there is no α-substituent.

In the Journal of Polymer Science: Part A: Polymer Chemistry, Vol 28, 3587–3601 (1990), the authors suggest synthesis of organochromium compounds, beta-stabilized chromium alkyls for testing catalytic activity in ethylene polymerization. The compounds are purported to exhibit activity when reacted with a partially dehydroxylated high surface area carrier. The poorest supports are said to be silica.

SUMMARY

In one embodiment, this invention includes a catalyst system that is the product of combining: a compound represented by the formula:

$$CrR_4$$

wherein each R is independently a hydrocarbyl or substituted hydrocarbyl, with the proviso that R may not be cyclopentadienyl groups; an activator represented by the formula:

$$MQ_2,$$

where M is a Group II metal and is preferably magnesium, and each Q is independently an alkyl, or substituted alkyl the substituents in are preferably selected from one or more of Cl, Br, I, F and SiQ'$_3$, where each Q' is independently a $C_1$–$C_{30}$ hydrocarbyl or $C_1$–$C_{30}$ substituted hydrocarbyl; and a support.

In another embodiment, this invention includes a catalyst system, comprising the product of: a compound represented by the formula:

$$CrR_4$$

wherein each R is independently a hydrocarbyl or substituted hydrocarbyl where the substituents are selected from one or more of Cl, Br, I, F, and SiR'$_3$, where each R' is independently a $C_1$–$C_{20}$ hydrocarbyl or $C_1$–$C_{20}$ substituted hydrocarbyl; with the proviso that R may not be a cyclopentadienyl group; an activator represented by the general formula:

$$MQ_2,$$

where M is a Group II metal, preferably magnesium, and each Q is independently an alkyl, or substituted alkyl wherein the substituents comprise one or more of Cl, Br, I, F or SiQ'$_3$, where each Q' is independently a $C_1$–$C_{30}$ hydrocarbyl or $C_1$–$C_{30}$ substituted hydrocarbyl; and a support.

In any embodiment described herein, the catalyst compound hydrocarbyl or substituted hydrocarbyl may have from 1–50 carbon atoms, 1–30 carbon atoms, 1–20 carbon atoms, or 1–10 carbon atoms. The hydrocarbyl in any embodiment described herein may be substituted with one or more Cl, Br, I, F, or SiR'$_3$, where each R' is independently a $C_1$–$C_{30}$ hydrocarbyl or $C_1$–$C_{30}$ substituted hydrocarbyl, or a $C_1$–$C_{20}$ hydrocarbyl or $C_1$–$C_{20}$ substituted hydrocarbyl. In any embodiment described herein, the catalyst compound may be selected from: $Cr(CH_2SiMe_3)_4$, $Cr(CH_2CMe_3)_4$, $Cr(CH_2CMe_2Ph)_4$, $Cr(CH_2CPh_3)_4$, and $Cr(CH_2C_6H_{11})_4$.

In preferred embodiments the activator is selected from MgBu(Et), Mg(n-hexyl)$_2$, and MgBu$_2$.

Preferred supports include silica, alumina or combinations thereof. The most preferred support is dehydrated silica.

Particularly preferred embodiments include a catalyst system comprising the product of combining: $Cr(CH_2SiMe_3)_4$, $Cr(CH_2CMe,)_4$, $Cr(CH_2CMe_2Ph)_4$, $Cr(CH_2CPh_3)_4$, or $Cr(CH_2C_6H_{11})_4$; with MgBu(Et), Mg(n-hexyl)$_2$, or MgBu$_2$; and silica support.

Other embodiments of this invention include a process for polymerizing olefins comprising combining under suitable polymerization conditions: a) a catalyst system comprising the product of: a compound represented by the formula:

$$CrR_4$$

wherein each R is independently a hydrocarbyl or substituted hydrocarbyl, with the proviso that R may not be a cyclopentadienyl group; an activator represented by the formula:

$$MQ_2,$$

where M is a Group II metal, preferably magnesium, and each Q is independently an alkyl, or substituted alkyl. Preferably Q is a substituted hydrocarbyl, said substituents selected from one or more of Cl, Br, I, P, and SiQ'$_3$, where each Q' is independently a $C_1$–$C_{30}$ hydrocarbyl or $C_1$–$C_{30}$ substituted hydrocarbyl; and a support; with b) with ethylene; and/or c) one or more α-olefins, preferably one or more of propylene, butene-1, pentene-1, hexene-1, octene-1, decene-1, 2-methyl-propene-1, 3-methylbutene-1, 2-methylbutene-1, 3-methylpentene-1, 4-methylpentene-1, 1,3-butadiene, 1,4-pentadiene, 1,5-hexadiene, 1,4-hexadiene, cyclopentene, cyclohexene, cycloheptene, propyne, butadyne, styrene, and 1,4-dihexyne, 3,3-dimethyl-1-butene; 1-pentene comprising one or more methyl, ethyl or propyl substituents; said 1-hexene comprising one or more methyl, ethyl or propyl substituents; 1-heptene comprising one or more methyl, ethyl or propyl substituents; 1-octene comprising one or more methyl, ethyl or propyl substituents; 1-nonene comprising one or more methyl, ethyl or propyl substituents; ethyl, methyl or dimethyl-substituted 1-decene; 1-dodecene; and styrene. Of these, propylene, butene-1, pentene-1, hexene-1, or octene-1 are most preferred.

Any embodiment of the process described herein may further include obtaining a polymer comprising ethylene derived units and units derived from propylene, butene-1, 4-methyl-1-pentene, hexene-1, and/or octene-1.

In any embodiment of the process described herein, each R substituent is independently Cl, Br, I, F, or SiR'$_3$, wherein each R' is independently a $C_1$ or $C_2$–$C_{30}$ hydrocarbyl or substituted $C_1$ or $C_2$–$C_{30}$ hydrocarbyl.

In any embodiment of the process described herein the catalyst compound may be selected from Cr(CH$_2$SiMe$_3$)$_4$, Cr(CH$_2$CMe$_3$)$_4$, Cr(CH$_2$CMe$_2$Ph)$_4$, Cr(CH$_2$CPh$_3$)$_4$, and Cr(CH$_2$C$_6$H$_{11}$)$_4$.

In any embodiment of the process described herein, the activator may be selected from MgBu(Et), Mg(n-hexyl)$_2$, and MgBu$_2$.

In any embodiment of the process described herein, the support may include silica, preferably dehydrated.

In one embodiment of the process, the catalyst compound is selected from Cr(CH$_2$CMe$_3$)$_4$, and Cr(CH$_2$SiMe$_3$)$_4$, the activator is selected from MgBu$_2$, Mg(n-hexyl)$_2$, or MgBuEt, and the support comprises dehydrated silica.

Another embodiment of the process includes combining under suitable polymerization conditions: a) a catalyst system comprising the product of: a compound represented by the formula:

CrR$_4$ wherein each R independently is a hydrocarbyl or substituted hydrocarbyl, with the proviso that R may not be a cyclopentadienyl group, wherein the hydrocarbyl substituents are one or more of Cl, Br, I, F, or SiR'$_3$, where each R' is independently a $C_1$–$C_{30}$ hydrocarbyl or substituted hydrocarbyl; an activator represented by the formula:

MQ$_2$, where M is magnesium, and each Q is independently a substituted hydrocarbyl, said substituents selected from one or more of Cl, Br, I, F, or SiQ'$_3$, where each Q' is independently a $C_1$–$C_{30}$ hydrocarbyl or $C_1$–$C_{30}$ substituted hydrocarbyl, an alkyl, or substituted alkyl; and a support; with b) with ethylene; and c) butene-1, 4-methyl-1-pentene, hexene-1, and/or octene-1; and d) obtaining a polymer having ethylene derived units and units derived from propylene, butene-1, 4-methyl-1-pentene, hexene-1, and/or octene-1.

Description

Process

In some embodiments, this invention is a process for the polymerization or copolymerization of olefins, comprising activating the tetra-hydrocarbyl chromium catalyst and contacting it with ethylene and/or one or more $C_3$–$C_{20}$ alpha-olefins alone or with other unsaturated monomers comprising one or more $C_5$–$C_{20}$ alpha-olefins, $C_5$–$C_{20}$ diolefins, and/or acetylenically unsaturated monomers, either alone or in combination with other olefins and/or other unsaturated monomers. In some embodiments, the catalyst system used in these processes is an activated and preferably supported, tetra-hydrocarbyl chromium catalyst component as further described herein. The catalyst may be activated with an Group II alkyl compound (MQ$_2$) (hereinafter defined) preferably in an amount to provide a molar ratio of the Group II Metal (M), to chromium, of from 1:10 to 2000:1 to form a catalyst system that reacts with the monomer(s) at a temperature from a lower limit of $\geq$–100° C., or $\geq$–50° C., or $\geq$–30° C., or $\geq$–20° C., to an upper limit of $\leq$300° C., or $\leq$250° C., or $\leq$220° C., or $\leq$200° C. The reaction pressure may range from a lower limit of $\geq$1 mm Hg, or $\geq$0.1 bar, or $\geq$1.0 bar to an upper limit of $\leq$2500 bar, or $\leq$1600 bar, or $\leq$500 bar; for a time of from one second to 10 hours, to produce a polyolefin having a weight average molecular weight of from a lower limit of $\geq$1000, or $\geq$20,000, or $\geq$30,000, or $\geq$40,000, or $\geq$50,000 to an upper limit of $\leq$5,000,000 or, $\leq$1,000,000, or, $\leq$500,000; a molecular weight distribution of from 2 to 30 or 5 to 30; a density of $\geq$0.86, or $\geq$0.88, or $\geq$0.90 or $\geq$0.91, or $\geq$0.92, or $\geq$0.93 or $\leq$0.97, or $\leq$0.96, or $\leq$0.95 g/cc; and a melt index of from 0.001–20 g/10 min. (I$_2$).

In any embodiment described herein, the catalyst system may be employed in liquid phase (solution, slurry, suspension, bulk phase or combinations thereof), in high pressure liquid or supercritical fluid phase, or in gas phase. Each of these processes may be employed in singular, parallel or series reactors. The liquid processes involve contacting olefin monomers with the above described catalyst system in a suitable diluent or solvent and allowing the monomers to react for a sufficient time to produce the polymers. Hydrocarbyl solvents are suitable, both aliphatic and aromatic. Hexane and toluene are among those contemplated. Bulk and slurry processes typically involve contacting the catalyst system with a liquid monomer, the catalyst system preferably being supported. Gas phase processes typically use a supported catalyst and are conducted in any manner known to be suitable for ethylene homopolymers or copolymers prepared by polymerization. Illustrative examples may be found in U.S. Pat. Nos. 4,543,399, 4,588,790, 5,028,670, 5,382,638, 5,352,749, 5,436,304, 5,453,471, and WO 95/07942. Each is incorporated by reference. Both inorganic oxide and polymeric supports may be utilized. For example, see U.S. Pat. Nos. 5,422,325, 5,427,991, 5,498,582 and 5,466,649, WO 93/11172 and WO 94/07928. Each of the foregoing documents is incorporated by reference.

Ethylene α-olefin co-polymers (including ethylene-cyclic olefin co-polymers and ethylene α-olefin-diolefin co-polymers) may be prepared utilizing the catalysts of embodiments of the Invention under slurry polymerization processes, or by introducing ethylene gas into a slurry utilizing the α-olefin or cyclic olefin or mixtures thereof, with other monomers, polymerizable and not, as a polymerization diluent in which the catalyst is suspended. The process may be carried out in a stirred tank reactor, or more than one reactor operated In series or parallel.

Pre-polymerization of the supported catalyst of the invention may also be used for further control of polymer particle morphology in typical slurry or gas phase reaction processes in accordance with conventional teachings. For example, such may be accomplished by pre-polymerizing ethylene and/or one or more $C_3$–$C_8$ α-olefins for a limited time, for example, ethylene may be contacted with the supported catalyst at a temperature of –15° to 30° C., and ethylene pressure of up to 250 psig (1724 kPa) for 75 min to obtain a polymeric coating on the support of polyethylene of 30,000–150,000 molecular weight. The pre-polymerized catalyst may then be available for use in the polymerization processes referred to above. The use of polymeric resins as a support may additionally be utilized, typically by suspending a solid support in dissolved resin of such material as polystyrene with subsequent separation and drying.

Invention processes for polymerizing monomers include:

(a) contacting ethylene, and/or other alpha-olefins, cyclic olefins, ethylenically unsaturated non-cyclic non-conjugated polyenes, cyclic non-conjugated polyenes, acetylenically unsaturated monomers, or mixtures thereof with the catalyst system as described herein;

(b) maintaining the contacting step of (a) for a sufficient time, and under conditions sufficient to polymerize monomers; and (c) recovering polymer product.

The catalyst system may be formed in a polymerization reactor, by introducing a supported tetra-hydrocarbyl chromium catalyst and an activator, as described herein to form a catalyst system. The catalyst and activator may be contacted by co-feeding the catalyst and activator to the reactor, or feeding the catalyst and activator separately to the reactor.

The catalyst and activator may be contacted by co-feeding the catalyst and supported activator to the reactor, or feeding the catalyst and supported activator separately to the reactor.

As used herein, the term "co-fed" means that supported catalyst and activator feed streams are combined and fed together into the reactor.

In some embodiments, ethylene may be polymerized without intentional addition of comonomer. In any of the embodiments described herein, hydrogen may be used if desired to control the molecular weight, as is well known in the art.

Polymerization methods may generally be carried out in a slurry reactor, such as a stirred slurry reactor or a slurry loop reactor, or in a gas phase reactor. Slurry reactor methods are described below with reference to a slurry loop reactor.

The slurry loop olefin polymerization reactor may be operated in a single stage process or in multistage processes. In multistage processing, the polymerization of olefins may be carried out in two or more reactors. These reactors may be configured in series, in parallel, or a combination thereof.

In other embodiments, the invention is a process for polymerizing or copolymerizing ethylene in a slurry reactor, by introducing a supported tetra-hydrocarbyl chromium catalyst; providing an activator selected from Group II alkyls; contacting the supported catalyst and activator by co-feeding the supported catalyst and activator to the reactor or feeding the supported catalyst and activator separately to the reactor, to form a catalyst system; and contacting the catalyst system, under suitable polymerization conditions, with ethylene to form polyethylene or with ethylene and one or more comonomers to form an ethylene copolymer.

A slurry loop olefin polymerization reactor may generally be described as a loop-shaped continuous tube. In some instances, the reactor design may be generally "O" shaped. One or more fluid circulating devices, such as an axial pump, create a circulating current or flow of the reactor constituents within the tube. The fluid circulating devices are designed to provide high velocity of motion and an intensive and well-defined mixing pattern of the reactor constituents. The reactor may be totally or partially jacketed with cooling water in order to remove heat generated by olefin polymerization.

In the slurry loop reactor, the polymerization medium may include a monomer, optional comonomer, and/or a hydrocarbon solvent or diluent, such as aliphatic paraffin. Specific examples are propane, isobutane, hexane, heptane, or cyclohexane. An aromatic diluent such as toluene, or mixtures thereof may also be suitable. The polymerization may be carried out at a temperature of from a lower limit of 50 or 60 or 70 or 80 or 90° C. to an upper limit of 150 or 140 or 130 or 120 or 110 or 100° C., with ranges from any lower limit to any upper limit being contemplated. In another embodiment, the polymerization may be carried out at a temperature of greater than 95° C. or greater than 100° C. In another embodiment, the polymerization may be carried out at a temperature of $\geq 100°$ C. to $\leq 110°$ C. Pressures may vary from 100 to 700 psia (0.69–4.8 MPa). Additional description is given in U.S. Pat. Nos. 5,274,056 and 4,182,810 and WO 94/21962, incorporated herein by reference As such, the reactor constituents generally are a combination of both solids, such as supported catalyst and polymerized olefin, and liquids, such as those described above. The percentage of solids within the reactor constituents may be as high as 60 wt % of the reactor constituents. Typically, the weight percent of solids is in the range of 45 to 55 wt %.

Gas phase processes also typically require a supported catalyst, and are conducted in any manner known to be suitable for production of ethylene homopolymers or copolymers. Illustrative examples may be found in U.S. Pat. Nos. 4,543,399, 4,588,790, 5,028,670, 5,352,749, 5,382,638, 5,405,922, 5,422,999, 5,436,304, 5,453,471, WO 94/28032, WO 95/07942 and WO 96/00245. Each is incorporated by reference. Continuous processes using fluidized beds and recycle streams as the fluidizing medium are also contemplated.

Chromium Compound

Among the chromium compounds within the scope of our invention are tetra-hydrocarbyl chromium catalysts represented by the general formula:

$$CrR_4$$

wherein each R is independently a hydrocarbyl or substituted hydrocarbyl, with the proviso that R may not be a cyclopentadienyl group. Or each R may independently be a hydrocarbyl or substituted hydrocarbyl where each hydrocarbyl and/or substituted hydrocarbyl has from 1–50 carbon atoms. (By "independent" as used through out this description and claims we mean that the substituents may be different from one another. For example in this case, by "independent" we intend that each R may be the same or each may be different, or two R groups may be the same with two others each different from the first two, or two R moieties may be the same with two others being the same but different from the first two, or three R moieties may be the same with the fourth being different.)

In other embodiments the substituted hydrocarbyl contains one or more of Cl, Br, I, F, or SiR'$_3$, where each R' is independently a $C_1$–$C_{10}$, or $C_1$–$C_{30}$ hydrocarbyl.

Suitable hydrocarbyl radicals, for R or R' in the above formulae, include straight and branched alkyl radicals, cyclic hydrocarbon radicals, alkyl-substituted cyclic hydrocarbon radicals, aromatic radicals, alkyl-substituted aromatic radicals. Suitable substituted hydrocarbyl radicals are hydrocarbyl radicals as defined above which may independently be substituted with one or more halogen. Suitable radicals for R or R' in all the above formulae include trimethylsilylmethyl, trimethylsilyl, triethylsilyl, ethyldimethylsilyl, or methyldiethylsilyl.

Or the catalyst composition is one or more of: $Cr(CH_2SiMe_3)_4$, $Cr(CH_2CMe_3)_4$, $Cr(CH_2CMe_2Ph)_4$, $Cr(CH_2CPh_3)_4$, or $Cr(CH_2-C_6H_{11})_4$, $Cr(CH_2CPr_3)_4$, $Cr(CH_2CBu_3)_4$, $Cr(CH_2CHex_3)_4$, $Cr(CH_3SiPr_3)_4$, $Cr(CH_2SiBu_3)_4$, $Cr(CH_2SiHex_3)_4$, $Cr(CH_2SiPr_3)_4$, $Cr(CH_2SiEt_3)_4$, $Cr(CH_2CMe_2Bu)_4$, $Cr(CH_2CMe_2Hex)_4$, $Cr(CH_2CMe_2Pr)_4$, $Cr(CH_2CPh_3)_4$, $Cr(CH_2\text{-cyclohexyl})_4$, Where Pr=propyl, Bu=butyl, Hex=hexyl, Ph=phenyl, Me=methyl, and Et=ethyl.

Group II Metal Activator

The catalyst may be activated with a Group II alkyl or a Group II substituted alkyl compound represented by the general formula:

$$MQ_2,$$

where M is Group II metal, where each Q is independently an alkyl, or substituted alkyl. M may also be magnesium. In other embodiments, The activator is one or more of MgBu (Et), Mg(n-hexyl)$_2$, MgBu$_2$, butyl being indicated by Bu, MgPh$_2$, MgPhEt, MgPhMe, MgPhPr, MgPhη-hex, Mg Me$_2$, Mg Me Bu, MgMeEt, MgMePr, MgMeη-hex; MgBuPr, MgBuη-hex, Mg Ph i-Bu, MgEt$_2$, MgEtη-hex, MgBuPr, Mg (i-Bu)$_2$, Mg i-BuEt, Mg i-BuPr, Mg i-BuBu, or Mg i-Buη-hex. Where Pr=propyl, Bu=butyl, Hex=hexyl, Ph=phenyl, Me=methyl, Et=ethyl, and i-Bu=isobutyl.

In any embodiment described herein, the activator may be represented by the formula MgQ$_2$, wherein each Q is independently an ethyl, methyl, propyl, butyl, isobutyl, pentyl, isopentyl, hexyl, heptyl or octyl, nonyl, cetyl, 2-ethylhexyl, phenyl, or benzyl. When Q is a substituted alkyl, the substituents are selected from one or more of Cl, Br, I, F and $SiQ'_3$, where each Q' is independently a $C_1$–$C_{30}$ alkyl or substituted alkyl. Suitable alkyl radicals, for Q or Q' in all the above formulae, may contain from 1 to 50 carbon atoms, or 2–30, or 2–20 or 2–10 (including methyl, ethyl and all isomers of butyl and propyl etc.) carbon atoms, and include straight and branched alkyl radicals, cyclic hydrocarbon radicals, alkyl-substituted cyclic hydrocarbon radicals, aromatic radicals, alkyl-substituted aromatic radicals. Suitable substituted alkyl radicals may be alkyl radicals as defined above, which are independently substituted with one or more halogen. Specific radicals for Q or Q' in all the above formulae include trimethylsilylmethyl, trimethylsilyl, triethylsilyl, ethyldimethylsilyl, or methyldiethylsilyl.

Monomers

In general, the catalyst systems of this invention polymerize olefins, diolefins and/or ethylenically or acetylenically unsaturated monomers either alone or in combination with other olefins and/or other unsaturated monomers at conditions suitable for conventional chromium catalysts.

Suitable monomers include ethylene, other alpha-olefins, diolefins, cyclic olefins, ethylenically unsaturated non-cyclic non-conjugated polyenes, cyclic non-conjugated polyenes, acetylenically unsaturated monomers, or combinations thereof, or unsaturated hydrocarbons containing from 2 to 18, 2–10 or 2–6 carbon atoms. Such monomers include cyclic and acyclic hydrocarbons, and straight or branched chain hydrocarbons. Examples of suitable comonomers include linear $C_3$–$C_{12}$ α-olefins, and α-olefins having one or more $C_1$–$C_3$ alkyl branches, or an aryl group. Illustrative of suitable monomers are: ethylene, propylene, butene-1, pentene-1, hexene-1, octene-1, decene-1, 2-methyl-propene-1, 3-methylbutene-1, 2-methylbutene-1, 3-methylpentene-1, 4-methylpentene-1, 1,3-butadiene, 1,4-pentadiene, 1,5-hexadiene, 1,4-hexadiene, cyclopentene, cyclohexene, cycloheptene, propyne, butadyne, styrene, and 1,4-dihexyne, 3,3-dimethyl-1-butene.

Other useful comonomers include conjugated and non-conjugated dienes, which may be included in minor amounts in terpolymer compositions. Non-conjugated dienes useful as co-monomers preferably are straight chain, hydrocarbon diolefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclooctadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, tetracyclo-(Δ-11,12)-5,8-dodecene and vinyl cyclododecene.

The amount of comonomer used will depend upon the desired density of the polyolefin and the specific comonomers selected. One skilled in the art may readily determine the appropriate comonomer content appropriate to produce a polyolefin having a desired density. As used herein, the term "comonomer" includes mixtures of two or more comonomers.

Support Materials

The catalyst systems described herein may further comprise a support. Any effective method of supporting coordination catalysts may be used. Methods for supporting catalyst systems are well known in the art. For purposes of this patent specification the terms "carrier" and "support" are interchangeable and may comprise any effective support material.

The support materials may be porous inorganic oxide materials, which include those from the Periodic Table of Elements of Groups 2, 3, 4, 5, 13 or 14 metal/metalloid oxides. Silica, alumina, silica-alumina, and mixtures thereof are also contemplated. Other inorganic oxides that may be employed either alone or in combination with the silica, alumina or silica-alumina are magnesia, titania, zirconia, or thoria.

In some embodiments, the support material may be porous silica, and may have a surface area in the range of from a lower limit of from $\geq 10$ m$^2$/g, or $\geq 50$ m$^2$/g, or $\geq 100$ m$^2$/g, to an upper limit of $\leq 700$ m$^2$/g, or $\leq 500$ m$^2$/g, or $\leq 400$ m$^2$/g; a total pore volume in the range of from a lower limit of $\geq 0.1$, or 0.5, or 0.8 cc/g to an upper limit of $\leq 4.0$, or $\leq 3.5$ or $\leq 3.0$ cc/g; and an average particle size in the range of from $\geq 10$, or $\geq 20$, or $\geq 30$ μm, to an upper limit of $\leq 500$ or $\leq 200$ or $\leq 100$ μm. The average pore size (diameter) may be in the range of from a lower limit of $\geq 10$, or $\geq 50$ or $\geq 75$ Å to an upper limit of $\leq 1000$, or $\leq 500$ or $\leq 350$ Å.

The tetra-hydrocarbyl chromium catalyst, activator and support material may be combined in any number of ways to prepare the active catalyst system. More than one catalyst, activator and/or support may also be used. Examples of suitable support techniques are described in U.S. Pat. Nos. 4,808,561 and 4,701,432, each fully incorporated herein by reference. Tetra-hydrocarbyl chromium and an activator may be combined and their reaction product supported on the porous support material as described in U.S. Pat. No. 5,240,894 and WO 94/28034, WO 96/00243, and WO 96/00245, each fully incorporated herein by reference.

Regardless of whether the tetra-hydrocarbyl chromium and the activator are pre-contacted or whether the tetra-hydrocarbyl chromium and activator are co-fed, in some instances, the total volume of reaction solution applied to porous support may be less than 4 times the total pore volume of the porous support, or less than 3 times the total pore volume of the porous support or in the range of from more than 1 to less than 4.0 3.0 or 2.5 times the total pore volume of the porous support. Procedures for measuring the total pore volume of porous support are well known in the art. One such method is described in Volume 1, Experimental Methods in Catalyst Research, Academic Press, 1968, pages 67–96.

The supported catalyst system may be used directly in polymerization, or the catalyst system may be prepolymerized using methods well known in the art. For details regarding prepolymerization, see U.S. Pat. Nos. 4,923,833 and 4,921,825, EP 0 279 863 and EP 0 354 893, each fully incorporated herein by reference.

Among suitable supports is a high surface area, amorphous silica, such as a material marketed under the trade names of Davison 952 or Davison 955 by the Davison Chemical Division of W.R. Grace and Company. Granular silica and low surface area supports may also be used.

In another embodiment, the support may be a silica-titania support. Silica-titania supports are known and are of two types. In one type, the surface modified support, a titanium ester, is allowed to react with the hydroxyl groups of a pre-dried silica before the silica is calcined before use as a support as described in UK 1,429,174. In a second type the silica-titania support may be produced as described in U.S. Pat. Nos. 3,887,494, 5,096,868 or 6,174,981 by "co-gelling"

or co-precipitating silica and a titanium compound. Such a cogel may be produced by contacting an alkali metal silicate such as sodium silicate with an acid such as sulfuric acid, hydrochloric acid or acetic acid, or an acidic salt. She titanium component may be conveniently dissolved in the acid or alkali metal silicate solution and co-precipitated with the silica. The titanium compound may be incorporated in the acid in any form in which it subsequently may be incorporated in the silica gel formed on combination of the silicate and the acid and from which form it is subsequently convertible to titanium oxide on calcination. Suitable titanium compounds include halides such as $TiCl_3$ and $TiCl_4$, nitrates, sulfates, oxalates and alkyl titanates. In instances where carbon dioxide is used as the acid, the titanium may be incorporated into the alkali metal silicate itself. When using acidic salts, the titanium compound may be incorporated in the alkali metal silicate and in such instances, convenient titanium compounds are water soluble materials which generally do not precipitate the silicate, i.e., are those convertible to titanium oxide on calcination such as, for example, various titanium oxalates, such as $K_2TiO(C_2O_4)_2 \cdot H_2O$, $(NH_4)_2TiO(C_2O_4)_2 \cdot H_2O$ and $Ti_2(C_2O_4)_3 \cdot H_2O$. As used herein, the term "silica-titania" support includes supports formed by any of these coprecipitation or cogel processes, or other processes by which titania and silica are both incorporated into the support.

Further, the support may be treated by various methods known in the art, such as by fluoridation. Fluoridation treatment of supports is more fully discussed in U.S. Pat. No. 6,369,999, specific parts of which are incorporated by reference (col. 2, lines 10–34, col. 3 lines 4–16, and col. 3, line 59 carried over to col. 4 line 63).

Calcination may be used to remove water of hydration and/or hydroxyl groups from the support. The calcination temperature may be $\geq 100$, $\geq 200$, $\geq 300$, $\geq 400$ or $\geq 450$ or $\geq 500$ or $\geq 550°$ C. to $\leq 900°$ or $\leq 800°$ or $\leq 700°$ C., with ranges from any lower limit to any upper limit being contemplated. In an embodiment, the calcination temperature may be greater than 600° C. Typical heating times may be for 30 minutes to 50 hours, or 2 to 20 hours.

Calcination, or dehydration, may be carried out in a stream of fluidizing inert gas such as nitrogen, where the stream of fluidizing gas is continued as the material is cooled. As for example, the catalyst may be placed in a cylindrical tube and fluidized in dry nitrogen at 2 feet per minute linear velocity while being heated to a predetermined temperature, as noted above, and held at temperature for 6 hr. at the end of any such treatment. Alternatively, the calcinations may be carried out in air or oxygen, as long as at the end of such treatment, the air or oxygen is replaced with an inert gas.

Polymers

Among products of the catalysts, activators and supports of embodiments of our invention are those comprising linear polyethylene, including high and ultra-high molecular weight polyethylenes, including both homo- and copolymers with other alpha-olefin monomers, alpha-olefinic and/or non-conjugated diolefins, for example, $C_3$–$C_{20}$ olefins, $C_4$–$C_{20}$ diolefins, $C_4$–$C_{20}$ cyclic olefins or $C_8$–$C_{20}$ styrenic olefins, are produced by adding ethylene, and optionally one or more of the other monomers, to a reaction vessel. The one or more α-olefin derived units may be present in the ethylene copolymer in an amount of less than 30 mole percent based on the copolymer, or less than 25, or less than 20, or less than 15, or less than 10 or less than 5 mole percent. If the optional diene is present, it may range from $\geq 0.5$ to $\leq 10$ weight percent, or from $\geq 0.5$ to $\leq 7$ weight percent (based on FTIR determination). The ethylene content of the copolymer may generally range from 60–100 weight percent, or at least 70 and/or 95 weight percent or less.

The polymer may be linear, substantially linear, blocky or branched. For a discussion of such options, U.S. Pat. No. 6,245,846 is incorporated by reference.

Experimental

Ethylene Polymerization

Ethylene polymerization was carried out in a 2 L Zipperclave reactor. The reactor was first purged under a nitrogen flow for 2 hrs at 120–140° C. Then, hexane or optional 1-hexene solution of dibutylmagnesium (DBM), hydrogen if needed and 850 mL of isobutane were added to the reactor. The reactor was heated to 95 or 105° C. and pressurized with ethylene to a total pressure of 425 or 470 psig. 50 mg catalyst was finally charged to the reactor by addition of the remaining 150 mL of isobutane. During polymerization, the reactor temperature was controlled via thermocouples in the reactor and the external jacket. Ethylene was fed on demand to maintain the desired total pressure. The polymerization was terminated after 45 min by stopping heating and venting the volatiles.

Test Methods $I_2$ (g/10 minute) was determined according to ASTM D1238-95, Condition E.

$I_{21}$ (g/10 minute) was determined according to ASTM D1238-95, Condition F.

Density (g/cm$^3$) was determined according to ASTM D1505-98.

Cr content was analyzed by ICP-OES (inductively coupled plasma-optical emission spectroscopy) at Galbraith Laboratories, Inc., 2323 Sycamore Dr., Knoxville, Tenn. 37921-1750.

EXAMPLES

Catalyst A

In a nitrogen purge box, a 30 mL of glass bottle was charged with 67 mg of $Cr(CH_2CMe_3)_4$, 15 mL of hexane and 1.00 g of Grace Davison 955 silica dehydrated at 600° C. After 3 days of reaction at 23° C., the mixture was filtered. The solid was dried in vacuo for 1 hr to afford the silica supported catalyst.

Catalyst B

This catalyst was prepared similar to that of Catalyst A by using 67 mg of $Cr(CH_2CMe_3)_4$ and 1.00 g of Grace Davison 955 silica dehydrated at 400° C.

Catalyst C

This catalyst was prepared similar to that of Catalyst A by using 33 mg of $Cr(CH_2CMe_3)_4$ and 1.00 g of Grace Davison 955 silica dehydrated at 400° C.

Catalyst D

This catalyst was prepared similar to that of Catalyst A by using 100 mg of $Cr(CH_2CMe_3)_4$ and 1.50 g of Grace Davison 955 silica dehydrated at 250° C.

Catalyst E

This catalyst was prepared similar to that of Catalyst A by using 67 mg of $Cr(CH_2CMe_3)_4$ and 1.00 g of Grace Davison 955 silica dehydrated at 250° C.

Catalyst F

This catalyst was prepared similar to that of Catalyst A by using 67 mg of $Cr(CH_2CMe_3)_4$ and 1.00 g of Grace Davison 955 silica dehydrated at 200° C.

Table 1 summarizes Cr loading of the catalysts prepared.

TABLE 1

Grace Davison 955 silica supported $Cr(CH_2CMe_3)_4$ catalyst

| Catalyst | $SiO_2$ dehydration T, ° C. | Cr. calculated wt % | Cr measured wt % |
|---|---|---|---|
| A | 600 | 1.00 | 0.97 |
| B | 400 | 1.00 | 0.98 |
| C | 400 | 0.50 | |
| D | 250 | 1.00 | 1.08 |
| E | 250 | 1.00 | 1.02 |
| F | 200 | 1.00 | 0.97 |

Examples 1–5

Ethylene polymerization and copolymerization were conducted with Catalyst A and di butyl magnesium (DBM). The polymerization and testing results are summarized in Table 2.

Examples 6–14

Ethylene polymerization and copolymerization were conducted with Catalyst B and DBM. The polymerization and testing results are summarized in Table 3.

Comparative Examples 1–2

Ethylene polymerization and copolymerization were conducted with Catalyst B and triethyl aluminum (TEAL). The polymerization and testing results are summarized in Table 4.

Examples 15–18

Ethylene polymerization and copolymerization were conducted with Catalyst C and DBM. The polymerization and testing results are summarized in Table 5.

Examples 19–23

Ethylene polymerization and copolymerization were conducted with Catalyst D and DBM. The polymerization and testing results are summarized in Table 6.

Examples 24–28

Ethylene polymerization and copolymerization were conducted with Catalyst E and DBM. The polymerization and testing results arc summarized in Table 7.

Examples 29–32

Ethylene polymerization and copolymerization were conducted with Catalyst F and DBM. The polymerization and testing results are summarized in Table 8.

TABLE 2

Polymerization and Testing Data with Catalyst A[a]

| Example | Reactor T ° C. | 1-Hexene mL | Hydrogen mmol | Total Press. psig | Activity g/g/hr | $I_2$ g/10 min | $I_{21}$ g/10 min | Density g/cm³ |
|---|---|---|---|---|---|---|---|---|
| 1 | 95 | 0 | 0 | 425 | 1519 | 0.02 | 9.60 | 0.9491 |
| 2 | 95 | 0.75 | 0 | 425 | 1867 | 0.07 | 12.48 | 0.9486 |
| 3 | 95 | 0.75 | 60 | 425 | 1224 | 0.16 | 44.82 | 0.9514 |
| 4 | 95 | 0.75 | 120 | 425 | 1126 | 0.39 | 76.98 | 0.9498 |
| 5 | 105 | 0.75 | 0 | 470 | —[b] | | | |

[a]0.25 mmol DBM was used.
[b]The reactor was fouled.

TABLE 3

Polymerization and Testing Data with Catalyst B[a]

| Example | Reactor T ° C. | 1-Hexene mL | Hydrogen mmol | Total Press. psig | Activity g/g/hr | $I_2$ g/10 min | $I_{21}$ g/10 min | Density g/cm³ |
|---|---|---|---|---|---|---|---|---|
| 6 | 95 | 0 | 0 | 425 | 4323 | 0.01 | 1.95 | 0.9583 |
| 7 | 95 | 0.75 | 0 | 425 | 4764 | 0.04 | 4.21 | |
| 8 | 95 | 0.75 | 0 | 425 | 5110 | 0.03 | 4.54 | 0.9575 |
| 9 | 95 | 0.75 | 60 | 425 | 4691 | 0.01 | 6.55 | |
| 10 | 95 | 0.75 | 60 | 425 | 4213 | 0.12 | 20.35 | 0.9589 |
| 11 | 105 | 0 | 0 | 470 | 2890 | 0.05 | 8.52 | 0.9589 |
| 12 | 105 | 0.75 | 0 | 470 | 3532 | 0.12 | 18.74 | |
| 13 | 105 | 0.75 | 0 | 470 | 3819 | 0.07 | 19.32 | 0.9578 |
| 14 | 105 | 0.75 | 60 | 470 | 3609 | 0.15 | 23.26 | 0.9592 |

[a]0.25 mmol DBM was used.

TABLE 4

Polymerization and Testing Data with Catalyst B[a]

| Comparative Example | Reactor T °C. | 1-Hexene mL | Total Press. psig | Activity g/g/hr | $I_2$ g/10 min | $I_{21}$ g/10 min |
|---|---|---|---|---|---|---|
| 1 | 95 | 0 | 425 | 939 | 0.02 | 0.90 |
| 2 | 95 | 0.75 | 425 | 1171 | 0.00 | 0.24 |

[a]0.25 mmol TEAL was used.

TABLE 5

Polymerization and Testing Data with Catalyst C[a]

| Example | Reactor T °C. | 1-Hexene mL | Total Press. psig | Activity g/g/hr | $I_2$ g/10 min | $I_{21}$ g/10 min | Density g/cm$^3$ |
|---|---|---|---|---|---|---|---|
| 15 | 95 | 0 | 425 | 2072 | 0.00 | 1.96 | 0.9606 |
| 16 | 95 | 0.75 | 425 | 1824 | 0.00 | 3.98 | 0.9602 |
| 17 | 105 | 0 | 470 | 1467 | 0.04 | 18.20 | 0.9618 |
| 18 | 105 | 0.75 | 470 | 1428 | 0.03 | 14.26 | 0.9615 |

[a]0.25 mmol DBM was used.

TABLE 6

Polymerization and Testing Data with Catalyst D[a]

| Example | Reactor T °C. | 1-Hexene mL | Hydrogen mmol | Total Press. Psig | Activity g/g/hr | $I_2$ g/10 min | $I_{21}$ g/10 min | Density g/cm$^3$ |
|---|---|---|---|---|---|---|---|---|
| 19 | 95 | 0 | 0 | 425 | 6344 | | | |
| 20 | 95 | 0.75 | 0 | 425 | 4225 | | | |
| 21 | 105 | 0.75 | 0 | 470 | 1555 | 0.06 | 11.38 | 0.9604 |
| 22 | 105 | 0.75 | 60 | 470 | 2505 | 0.22 | 24.45 | 0.9581 |
| 23 | 105 | 0.75 | 120 | 470 | 2142 | 0.29 | 41.85 | 0.9597 |

[a]0.25 mmol DBM was used.

TABLE 7

Polymerization and Testing Data with Catalyst E[a]

| Example | Reactor T °C. | 1-Hexene mL | Total Press. psig | Activity g/g/hr | $I_2$ g/10 min | $I_{21}$ g/10 min | Density g/cm$^3$ |
|---|---|---|---|---|---|---|---|
| 24 | 95 | 0 | 425 | 4597 | 0.00 | 0.04 | |
| 25 | 95 | 0.75 | 425 | 4424 | | | |
| 26 | 105 | 0.75 | 470 | 1693 | 0.00 | 10.82 | |
| 27 | 105 | 0.75 | 470 | 1848 | 0.07 | 9.83 | |
| 28 | 105 | 0.75 | 470 | 2208 | 0.09 | 9.66 | 0.9611 |

[a]0.25 mmol DBM was used.

TABLE 8

Polymerization and Testing Data with Catalyst F[a]

| Example | Reactor T °C. | 1-Hexene mL | Hydrogen mmol | Total Press. psig | Activity g/g/hr |
|---|---|---|---|---|---|
| 29 | 95 | 0 | 0 | 425 | 3059 |
| 30 | 95 | 0.75 | 0 | 425 | 3395 |
| 31 | 105 | 0.75 | 0 | 470 | 389[b] |
| 32 | 105 | 0.75 | 60 | 470 | 1573[b] |

[a]0.25 mmol DBM was used.
[b]The reactor was fouled.

We claim:

1. A catalyst system, consisting essentially of the product of: a compound represented by the formula:

$$CrR_4$$

wherein each R is independently a hydrocarbyl or substituted hydrocarbyl, with the proviso that R is not a cyclopentadienyl group, and activator represented by the formula:

$$MQ_2,$$

where M is a Group II metal, and each Q is independently an alkyl, or substituted alkyl; and a support.

2. The catalyst system of claim 1, wherein each hydrocarbyl or substituted hydrocarbyl has from 1–50 carbon atoms.

3. The catalyst system of claim 1, wherein each hydrocarbyl or substituted hydrocarbyl has from 1–10 carbon atoms.

4. The catalyst system of claim 1, wherein said substituted hydrocarbyl includes one or more of Cl, Br I, F, or $SiR'_3$, where each R' is independently a $C_1$–$C_{30}$ hydrocarbyl or $C_1$–$C_{30}$ substituted hydrocarbyl.

5. The catalyst system of claim 1, wherein said substituted hydrocarbyl includes one or more of Cl, Br I, F, or $SiR'_3$, where each R' is independently a $C_1$–$C_{20}$ hydrocarbyl or $C_1$–$C_{20}$ substituted hydrocarbyl.

6. The catalyst system of claim 1, wherein each Q is independently a substituted hydrocarbyl, the substituents being selected from one or more of Cl, Br I, F, or $SiQ'_3$, where each Q' is independently a $C_1$–$C_{30}$ hydrocarbyl or $C_1$–$C_{30}$ substituted hydrocarbyl.

7. The catalyst system of claim 1, wherein M is magnesium.

8. The catalyst system of claim 1, wherein the activator is selected from MgBu(Et), Mg(n-hexyl)$_2$, or MgBu$_2$.

9. The catalyst system of claim 1, wherein the support comprises silica, alumina or combinations thereof.

10. A catalyst system, consisting essentially of the product of: a compound represented by the formula:

$$CrR_4$$

wherein each R is independently a hydrocarbyl or substituted hydrocarbyl where the substituents are selected from one or more of Cl, Br, I, F, or SiR'$_3$, where each R' is independently a C$_1$–C$_{20}$ hydrocarbyl or a C$_1$–C$_{20}$ substituted hydrocarbyl; with the proviso that R may not be a cyclopentadienyl group; an activator represented by the general formula:

$$MQ_2,$$

where M is a Group II metal, and each Q is independently an alkyl, or substituted alkyl wherein the substituents comprising one or more of Cl, Br, I, F or SiQ'$_3$, where each Q' is independently a C$_1$–C$_{30}$ hydrocarbyl or C$_1$–C$_{30}$ substituted hydrocarbyl; and a support.

11. The catalyst system of claim 10 wherein the compound is selected from:

$$Cr(CH_2SiMe_3)_4, \ Cr(CH_2CMe_3)_4, \ Cr(CH_2CMe_2Ph)_4, \\ Cr(CH_2CPh_3)_4, \ or \ Cr(CH_2C_6H_{11})_4.$$

12. The catalyst system of claim 10 wherein the activator is selected from MgBu(Et), Mg(n-hexyl)$_2$, or MgBu$_2$.

13. The catalyst system of claim 10 wherein the support is silica.

14. A catalyst system comprising the product of: a chromium compound selected from Cr(Ch$_2$SiMe$_3$)$_4$, Cr(CH$_2$CMe$_3$)$_4$, Cr(CH$_2$CMe$_2$Ph)$_4$, Cr(CH$_2$CPh$_3$)$_4$, or Cr(CH$_2$C$_6$H$_{11}$)$_4$; a magnesium compound selected from MgBu(Et), Mg(n-hexyl)$_2$, or MgBu$_2$; and silica support.

15. A catalyst system, comprising the product of: a compound selected from

Cr(CH$_2$CMe$_3$)$_4$, or Cr(CH$_2$SiMe$_3$)$_4$;

and activator selected from MgBu$_2$, MgBu(Et), or Mg(n-hexyl)$_2$;

and a support of dehydrated silica.

16. A catalyst system, comprising the product of:

a compound selected from: Cr(CH2SiMe$_3$)$_4$, Cr(CH2CMe$_3$)$_4$, Cr(CH,CMe$_2$Ph)$_4$, Cr(CH,CPh$_3$)$_4$, or Cr(CH$_2$C$_6$H$_{11}$)$_4$; and an activator represented by the formula: MQ$_2$, where M is a Group II metal, and each Q is independently an alkyl, or substituted alkyl; and a support.

17. The catalyst system of claim 16, wherein each Q is independently a substituted hydrocarbyl, the substituents being selected from one or more of Cl, Br I, F, or SiQ'$_3$, where each Q' is independently a C$_1$–C$_{30}$ hydrocarbyl or C$_1$–C$_{30}$ substituted hydrocarbyl.

18. The catalyst system of claim 16, wherein M is magnesium.

19. The catalyst system of claim 16, wherein the activator is selected from MgBu(Et), MS(n-hexyl)$_2$, or MgBu$_2$.

20. The catalyst system of claim 16, wherein the support comprises silica, alumina or combinations thereof.

* * * * *